United States Patent [19]

Mott

[11] Patent Number: 4,617,004

[45] Date of Patent: Oct. 14, 1986

[54] PULLEY STRAP DRIVE

[75] Inventor: Philip J. Mott, Des Plaines, Ill.

[73] Assignee: Borg-Warner Corporation, Chicago, Ill.

[21] Appl. No.: 650,022

[22] Filed: Sep. 13, 1984

[51] Int. Cl.[4] .......................................... F16H 55/56
[52] U.S. Cl. ........................................ 474/8; 474/28; 474/46
[58] Field of Search ................... 464/55, 69, 99, 100; 474/8, 903, 22, 46, 28, 17, 12

[56] References Cited

U.S. PATENT DOCUMENTS

| | | | |
|---|---|---|---|
| 1,124,966 | 1/1915 | Stack | 464/55 |
| 2,273,478 | 2/1942 | Thompson | 474/43 X |
| 3,393,572 | 7/1968 | Larsson | 474/17 |
| 3,780,538 | 12/1973 | Mann | 464/17 |
| 3,868,862 | 3/1975 | Bessette | 74/230.17 |
| 3,888,130 | 6/1975 | Blachette | 474/12 |
| 4,010,654 | 3/1977 | Maucher et al. | 474/13 |
| 4,019,345 | 4/1977 | Fukuda | 464/69 |
| 4,365,964 | 12/1982 | Krome, Jr. | 474/903 X |
| 4,386,920 | 6/1983 | Keck | 474/39 |

Primary Examiner—John M. Jillions
Attorney, Agent, or Firm—James A. Geppert

[57] ABSTRACT

The pulleys of a pulley transmission, such as a CVT, are constructed such that one flange is drivingly connected to a shaft by means of a flexible, pliable, spring-like straps or a pack of relatively thin straps. Because the pulley flange which can be axially movable with respect to the shaft, is radially supported by a hub encircling the shaft, only one strap or strap-pack need be provided.

5 Claims, 6 Drawing Figures

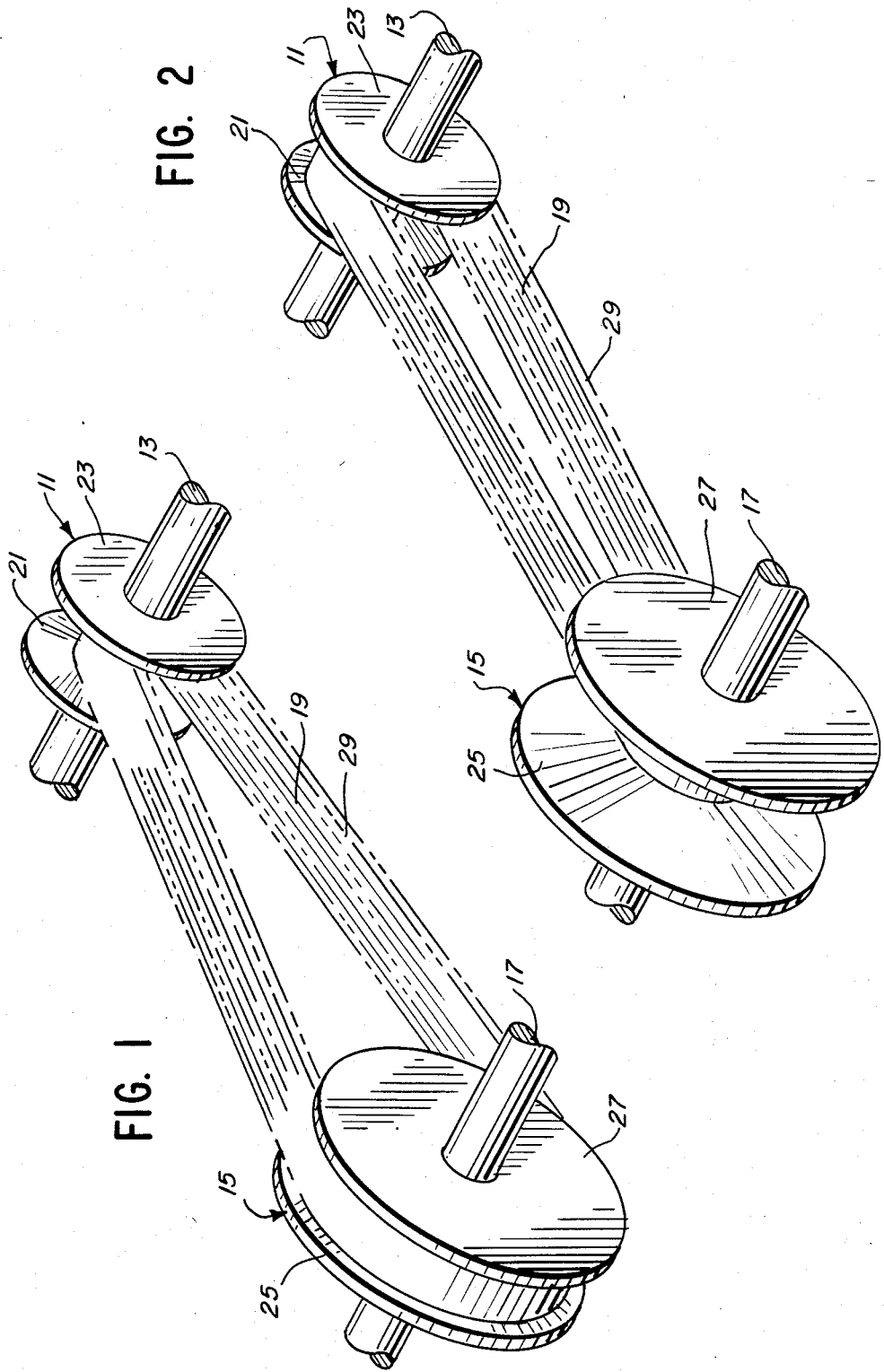

PULLEY STRAP DRIVE

BACKGROUND OF THE INVENTION

The present invention relates to a continuously variable transmission, at times referred to as a CVT. Transmissions of this type are well known in the art, and comprise a pair of cone pulleys, each pulley having a pair of sheaves or flanges. The pulleys are interconnected by a belt or the like. In the usual CVT, one pulley is connected to a drive or input shaft and the other pulley is connected to a driven or output shaft. Usually one flange of each pulley is axially movable on its respective shaft with respect to the other flange. By varying the spacing between the flanges of each pulley, continuous adjustment of the drive ratio is provided between the shafts within the limits of pulley sizes. Mechanical or hydraulic means and/or combinations of the two means are usually provided for initiating the drive ratio changes. The prior art is replete with such arrangements.

The axially movable flange of each pulley or a hub of such flange may be, according to the prior art, provided with an internal keyway to receive a key fitting in a keyway in the respective shaft to provide the driving connection between flange and shaft while permitting axial movement of at least one of the flanges. The keyways are machined in the shafts and flanges, an expensive procedure, and lubrication of the key-keyway connection is difficult at times. In the absence of proper lubrication, the key bends in the keyways and the movable flange behaves as a fixed flange, so that drive ratio changes are impeded. Loading on the key, under these circumstances, becomes excessive because of the physical mass of the pulley rotating at relatively high speeds and leads to premature failure of the transmission.

Another form of movable flange-shaft connection is the ball-spline in which a plurality of balls are used with a spline, the balls functioning as anti-friction elements. The ball-spline connection is located internally of the flange and/or its hub. This type of connection is expensive and requires continuous lubrication to insure continued performance. Loading on the spline of the ball-spline connection can also become excessive, leading to premature failure of the transmission.

Instead of the movable flange-shaft connections, as above described, Bessette, in U.S. Pat. No. 3,868,862, teaches the use of a pivotably connected link or links between the movable flange and the drive member. In one embodiment a single link is generally circumferentially arranged with respect to the flange and drive member, and in another embodiment, three spaced links are angularly arranged with respect to the flange and drive member. In both embodiments, the links must be rigid or stiff and must be provided with pivoting joints which, in the case of the second embodiment, are universal joints. To operate properly, these joints must be constantly lubricated. The link or links exert a force component to the pulley flange which either adds to or subtracts from the force applied by other means to the flange.

SUMMARY OF THE INVENTION

The variable pulley transmission, according to this invention, is a less expensive arrangement of parts which requires less lubrication than the arrangements before described, and thus is extremely reliable. More specifically, according to this invention, the movable flange of the pulley is rotatably driven from its shaft by at least one relatively flexible strap or strap-pack connecting the flange and a drive spider, the latter being fixed to the shaft while the flange is radially positioned by its hub on the shaft. Unlike many devices driven by straps, the arrangement herein described requires only one strap or strap-pack without any special pivot or joint construction and is located or positioned in a radial plane in its rest position. The strap or strap-pack must be flexible, so that it deforms or flexes axially to permit the movable flange to move axially on the shaft, but is sufficiently rigid so that it does not buckle under some operational conditions. When transmitting engine torque, the strap or strap-pack is stressed in tension. When transmitting brake torque, the strap or strap-pack is stressed in compression.

BRIEF DESCRIPTION OF THE DRAWINGS

FIGS. 1 and 2 are perspective illustrations of a variable pully transmission or CVT arrangement in two drive ratios;

DETAILED DESCRIPTION OF THE PREFERRED EMBODIMENT

Figure 3:
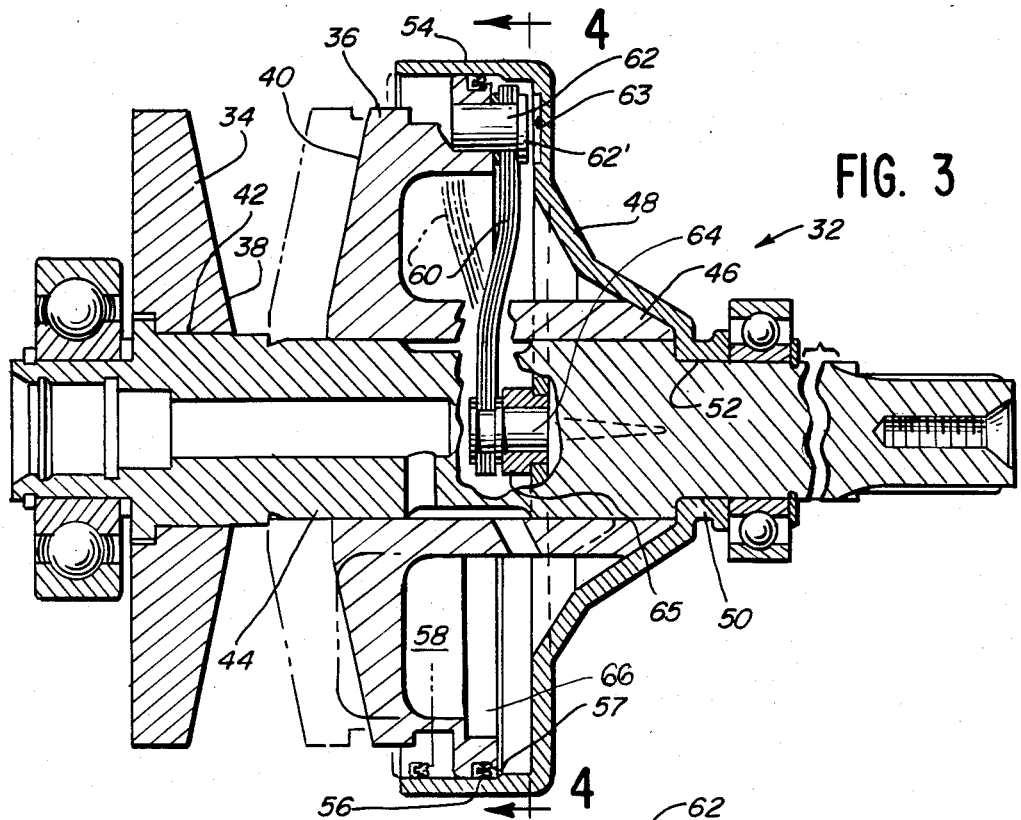
FIG. 3 is a longitudinal cross-sectional view of a pulley constructed according to this invention.

FIGS. 1 and 2 of the drawings illustrate schematically a continuously variable transmission (CVT) in two drive ratios, i.e., the underdrive and overdrive ratios. A first pulley 11 is connected to a shaft 13 and a second pulley 15 is connected to a shaft 17. One shaft is a drive shaft and the other shaft is a driven shaft. A continuous, flexible belt 19 interconnects the pulleys 11 and 15. Pulley 11 comprises generally conical flanges 21 and 23 while pulley 15 comprises generally conical flanges 25 and 27. In order to change the drive ratio between the pulleys and the shafts, flange 21 of pulley 11 is axially movable with respect to flange 23, and correspondingly, flange 27 of pulley 15 is axially movable with respect to flange 25. It is understood that both flanges of a pulley may be axially movable with respect to each other, but generally this is not necessary to effect the changes in the drive ratios between the pulleys and their respective shafts. Various types of controls may be used to effect the changes in drive ratio but these are not within the purview of this invention and need no further reference. As can be readily understood, the side surfaces or edges 29 of the continuous, flexible belt 19 frictionally engage the pulley flanges when transmitting torque from the drive pulley to the driven pulley. In CVTs, at least one of the flanges of each pulley is conical; in many, as shown herein, both flanges are conical.

A CVT pulley, constructed according to this invention is illustrated in FIG. 3 and is identified with the reference character 32, it being understood that the transmission comprises a pair of pulleys, one of which may be lesser in diameter than the other but substantially of the same construction. Therefore, only one pulley will be described in detail. The pulley 32 comprises a pair of generally conical flanges 34 and 36 with surfaces 38 and 40 defining a generally V-shaped space therebetween. Pulley flange 34 is press-fit at 42 onto a shaft 44, so as to be rotatable therewith. The shaft 44 is connected either to a prime mover or to a drivable means depending on whether or not it is a drive shaft or a driven shaft in a CVT, as explained with reference to FIGS. 1 and 2.

Flange 36 has an axial hub 46 axially slidable on shaft 44 toward and away from flange 34 to change the spacing of the flanges 34 and 36 and the space defined therebetween. The hub 46 radially positions the flange 36 on the shaft 44. A spider 48 having a hub 50 is press-fit onto the shaft 44 at 52, so as to be drivingly connected thereto. The spider 48 has a generally bell shape with an axially extending generally cylindrical flange 54 extending over a portion of pulley flange 36. A seal 56 received in a suitable groove 57 forms an hydraulic seal between the spider 48 and the pulley flange 36 yet it permits relative axial movement of the flange 36. A cavity 58 is defined by the pulley flange 36 and the spider 48 which can receive hydraulic fluid to urge the flange 36 toward the flange 34, the hydraulic fluid passing through suitable passages in the shaft 44 to the cavity 58. In that this aspect of the pulley forms no part of the invention being described herein, further description is deemed unnecessary.

Figure 4:
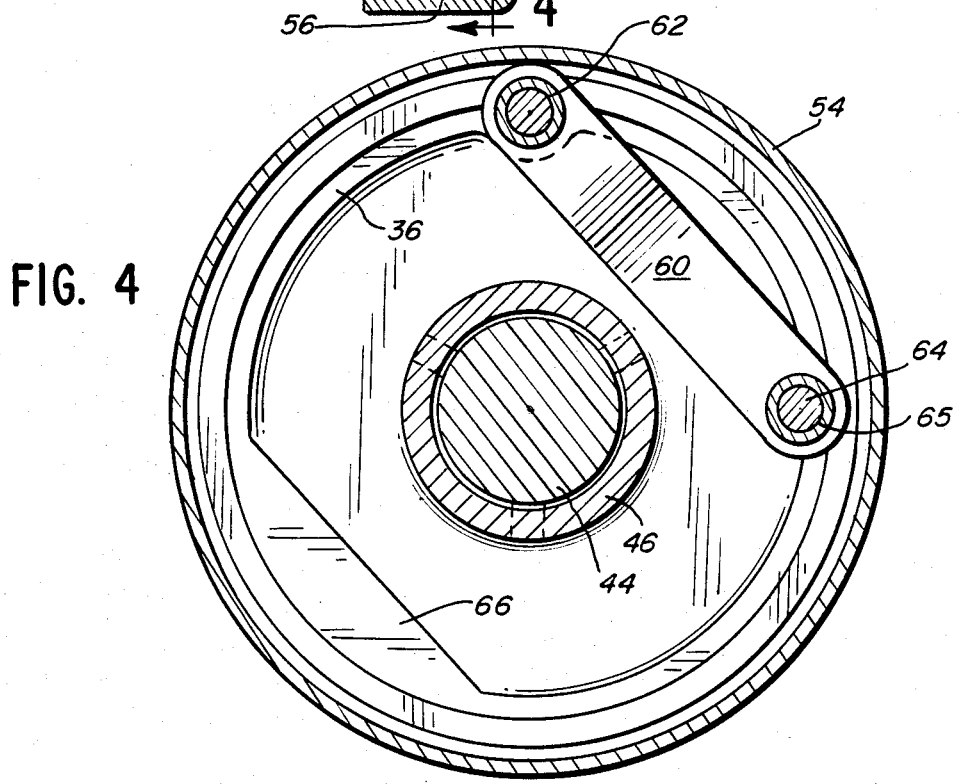
FIG. 4 is a cross-sectional view taken on line 4—4 of FIG. 3 looking in the direction of the arrows.
Figure 5:
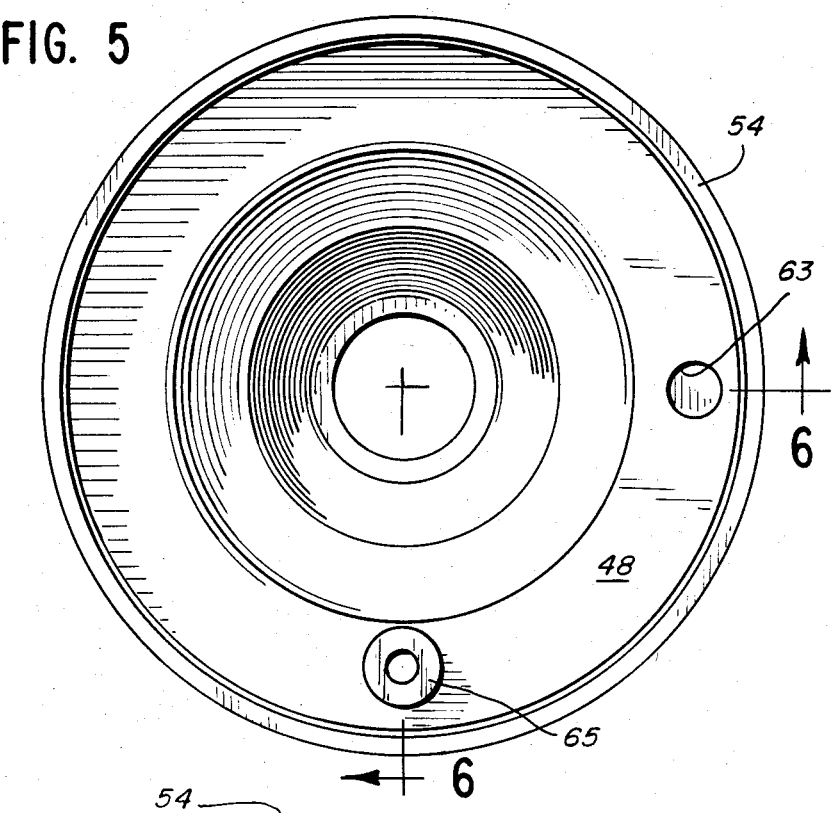
FIG. 5 is an elevational view of a spider usable in the CVT arrangement of this invention, as illustrated in FIG. 3.
Figure 6:
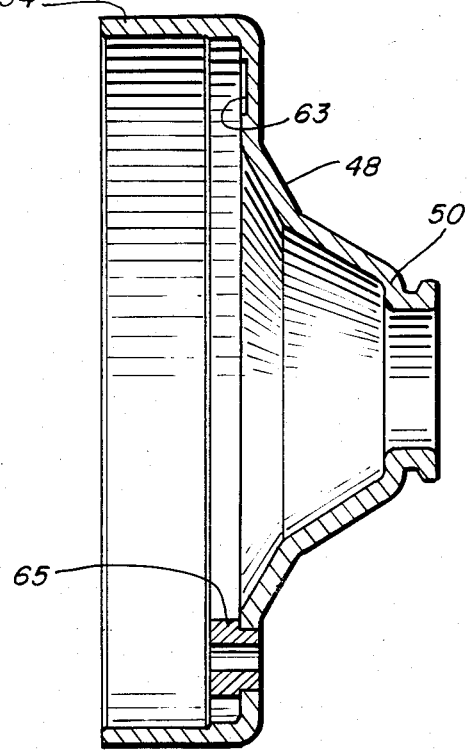
FIG. 6 is a cross-sectional view taken on irregular line 6—6 of FIG. 5.

A relatively flexible, and spring-like strap or strap-pack (if constructed of a plurality of sheet metal parts) 60 (see also FIG. 4) is positioned to pivot about axes generally parallel to the axis of the shaft 44 and is thus rotatably journaled by means of a rivet 62 to the pulley flange 36 and also by a rivet or pin 64 to the spider 48. In order to accommodate the head 62' of rivet 62, a depression 63 is formed in the spider 48. No special joint form is required because the joint need only permit slight rotation of the strap which occurs when there is an axial position change of the pulley flange, permitted by the flexing of the strap. The rivet 64 is received in a boss 65 secured (as illustrated in FIGS. 5 and 6) to the spider 48. The strap, which must flex axially, provides a positive drive between the spider 48 (and thus the shaft 44) and the pulley flange 36 while permitting axial movement of the pulley flange 36 toward and away from the pulley flange 34 and relative to the shaft 44. The strap or strap-pack thus must flex in transmitting engine torque to the pulley but does not buckle in its power transmission. The strap or the individual straps which constitute the strap-pack can be produced by stamping them from sheet metal. This arrangement described results in an inexpensive drive mechanism with many fewer problems than the conventional, expensive, key-keyway or ball-spline pulley flange-shaft drives. It is also less expensive and requires little lubrication when compared to the link drive previously described. To dynamically balance the strap, a counterweight portion of the flange, identified at 66, can be provided. Of course, multiple straps or packs of straps can be used if desired and the number of straps in a pack can be adjusted depending on the torque capacity of the pulley. In the use of multiple straps, the particular location is chosen to provide a dynamically balanced arrangement. However, as used herein strap and strap-pack can mean one or more individual straps or an assembly of a plurality of straps, each of which is flexible to permit the flange movement desired.

The subject invention provides a relatively inexpensive driving arrangement, avoiding the necessity for expensive machining of parts and avoiding the lubrication problems which can occur in conventional CVT drive arrangements.

The appended claims are intended to cover all reasonable equvalents of the structure.

I claim:

1. A pulley especially adapted for use in a variable pulley transmission and comprising first and second generally conical flanges mounted on a rotatable shaft and defining a generally V-shaped space therebetween, said first flange being directly and drivingly connected to said shaft for rotation therewith, said second flange being journalled for axial reciprocation on said shaft and free of direct driving connection therewith, said second flange being axially movable along said shaft relative to said first flange, a drive member concentric with and directly drivingly connected to said shaft, and a flexible strap connected to said drive member and said second flange and positioned to pivot about axes generally parallel to the axis of said shaft, said strap drivingly connecting said drive member and said second flange while permitting the axial movement of said second flange relative to said first flange, said strap lying in a generally radial plane so as to flex upon axial movement of said second flange.

2. A pulley as recited in claim 1 further comprising a plurality of straps connecting said second flange and said drive member and forming a strap-pack.

3. A pulley as recited in claims 1 or 2, in which said strap is constructed of a plurality of relatively thin spring-like members.

4. A pulley as recited in claim 1, in which said drive member comprises a cup-like spider having a central hub secured to said shaft and an outer axially flange at least partially enclosing said second flange.

5. A pulley as set forth in claim 1, in which said second flange includes a counterweight dynamically balancing said drive strap.

* * * * *